United States Patent [19]
Judd

[11] 3,876,283
[45] Apr. 8, 1975

[54] APPARATUS FOR PRODUCING OBLIQUE ILLUMINATION

[75] Inventor: Duane E. Judd, Rochester, N.Y.

[73] Assignee: Bausch & Lomb Incorporated, Rochester, N.Y.

[22] Filed: Oct. 15, 1973

[21] Appl. No.: 406,424

[52] U.S. Cl. ............... 350/87; 350/91; 240/MA
[51] Int. Cl. ................................. G02b 21/06
[58] Field of Search ........... 356/203; 350/6, 17, 91, 350/87; 240/MA

[56] References Cited
UNITED STATES PATENTS

| | | | |
|---|---|---|---|
| 3,253,498 | 5/1966 | Lindberg et al. | 350/6 |
| 3,497,289 | 2/1970 | Oberheuser | 350/182 |
| 3,746,421 | 7/1973 | Yoder | 350/6 |
| 3,798,435 | 3/1974 | Schindl | 350/91 |

*Primary Examiner*—Eli Lieberman
*Attorney, Agent, or Firm*—Frank C. Parker; DeWitt M. Morgan

[57] ABSTRACT

A vertical illuminator assembly for a microscope. The assembly includes a source of illumination, a first condenser lens system, an aperture diaphragm and a second condenser lens, all of which are centered with respect to the illuminator axis. Interposed between the aperture diaphragm and the second condenser lens is an obliquer element of optically transmitting material having first and second plane refracting surfaces which cooperate to offset the aperture diaphragm image relative to the illuminator axis. The second surface may be either parallel or inclined with respect to the first surface. Preferably the obliquer element is mounted for rotation about an axis transverse to the illuminator axis and, additionally, about an axis substantially coincident with the illuminator axis. Movement about the transverse axis varies the amount the aperture diaphragm image is offset relative to the illuminator axis. Movement about the coincident axis varies the angular location of the aperture diaphragm image with respect to the illuminator axis.

6 Claims, 5 Drawing Figures

APPARATUS FOR PRODUCING OBLIQUE ILLUMINATION

DESCRIPTION OF THE PRIOR ART

The purpose of oblique illumination is to direct light from a filament or other suitable source of illumination through an offcentered portion of the rear of a microscope objective and onto the specimen in an oblique cone. The effect of this cone of light is to highlight the unlevel areas of the specimen by casting shadows along the edges of the raised areas. In the past this has been accomplished by decentering an aperture diaphragm located between the light source and the microscope objective. This procedure has not proved entirely satisfactory due to the fact that it results in the use of the edge of the light source which, in the case of an arc source, is both uneven and unsymmetrical and has hot spots. Secondly, when the aperture diaphragm is decentered, part of the bundle of light which passes through the aperture diaphragm may be vignetted by the aperture of the first condenser lens to further reduce the quality of illumination.

SUMMARY OF THE INVENTION

Applicant overcomes the above described problems by use of, preferably, a plano plate which is tipped with respect to the optical axis of the illuminator. By use of such a plate the illumination is offset from rather than tipped relative to the optical axis. This permits the aperture diaphragm to remain centered which, in turn, permits the use of the illumination from the center of the source. Preferably, the plate itself is rotatably mounted with respect to an axis which is transverse to the optical axis of the illuminator so that the angle of inclination between the plate and the illuminator axis may be varied. With this arrangement it becomes an adjustable oblique illuminator to decenter the diaphragm image by the amount appropriate for the objective in use. By also making the plate rotatable about an axis parallel to the optical axis of the illuminator the direction of the oblique cone of light which strikes the specimen may additionally be chosen. When a wedge is added to the plano plate the illumination is both offset and tipped relative to the illuminator axis. This has the advantage of inducing an initial amount of tip from the wedge angle which may be increased or decreased by the offset as the plate is rotated relative to the transverse axis. The presence of the wedge, in combination with the plate, permits the use of a thinner plate.

DESCRIPTION OF THE PREFERRED EMBODIMENTS

Figure 1:
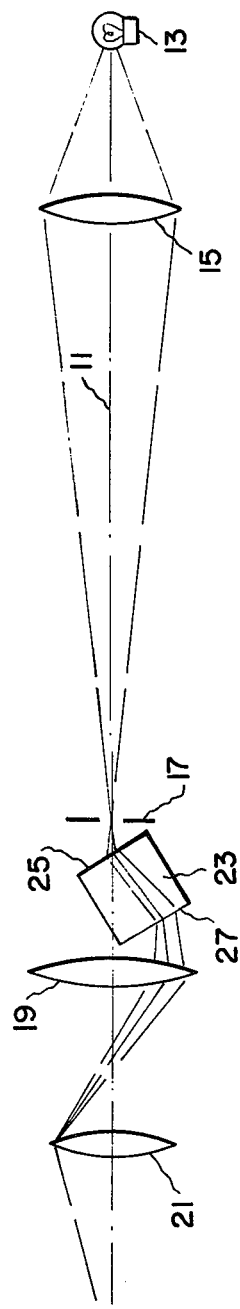
FIG. 1 is an optical schematic of the invention.

The optical schematic illustrated in FIG. 1 includes, in optically cooperative relation along axis 11, a source of illumination 13, a first condenser lens 15, an adjustable aperture diaphragm 17, a second condenser lens 19 and an objective 21. Interposed between aperture diaphragm 17 and lens 19 is an obliquer element 23 in the form of a glass plate having substantially parallel surfaces 25 and 27. Condenser 15 images source 13 in the center of aperture diaphragm 17. Rays from the aperture diaphragm image strike surface 25 of element 23 and are refracted, as illustrated in FIG. 1, downward away from axis 11. These rays upon their emergence from surface 27 are refracted a second time. As surface 27 is parallel to surface 25 the cone of rays which emerges from surface 27 is not deviated (i.e. bent) relative to axis 11 but merely laterally displaced from axis 11. From geometric optics it can be demonstrated that the amount of this displacement is dependent on the thickness of element 23 (i.e., spacing between surfaces 25 and 27) and upon the angle of incidence the rays have relative to surface 25. The angle of incidence is, in turn, dependent upon the inclination of surface 25 to axis 11. After being offset from axis 11, the light rays are converged by condenser lens 19 so as to form an image of aperture diaphragm 17 at the back focal plane of objective 21. Since the illumination is offset from rather than bent relative to axis 11 the center of source 13 is utilized and there is less vignetting.

Although element 23 is shown inclined relative to axis 11 at a preselected angle, it may be inserted normal to axis 11 and made rotatable about an axis transverse to axis 11 through any desired angle depending upon the amount of offset desired. Thus, the diaphragm image may be decentered by the amount appropriate for the objective in use. By also making plate 23 rotatable, conveniently about an axis substantially coincident with axis 11, the direction of the oblique cone of light which strikes the specimen may additionally be chosen.

Figure 2:
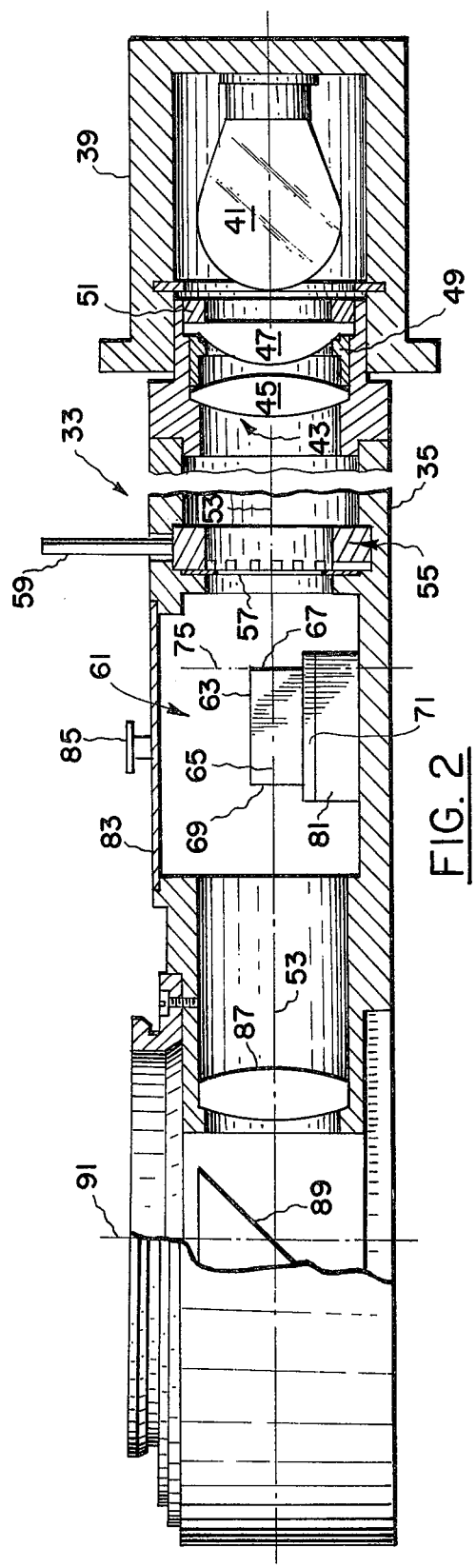
FIG. 2 is a partial sectional view of a vertical illuminator assembly.
Figure 3:
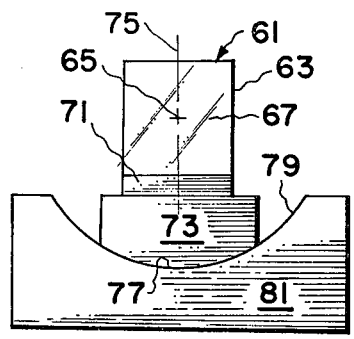
FIG. 3 is an end view on an enlarged scale of the obliquer illustrated in FIG. 2.

Illustrated in FIG. 2, is a vertical section of a vertical illuminator assembly 33 including a main housing 35 to the right hand end of which is attached source housing 39. Supported within housing 39 is a source of illumination 41.

Adjacent to the right hand end of housing 35 is a condenser assembly 43 including lenses 45 and 47 which are held in place by spacers 49 and 51. Lenses 45 and 47 are centered with respect to the optical axis 53 of the illuminator.

Located in the central portion of housing 35 is an adjustable aperture diaphragm assembly 55 of conventional design. Assembly 55 is centered with respect to axis 53 and spaced from condenser assembly 43 such that illumination from source 41 is brought to focus in the plane of aperture 57. Assembly 55 is also provided with a handle 59 for adjusting the size of the opening.

To the left of aperture diaphragm 55 is positioned obliquer assembly 61. Assembly 61 includes obliquer element 63 in the form of an elongated glass plate having a longitudinal axis 65 and first and second parallel surfaces 67 and 69. Element 63 is secured to plate 71 by conventional means, such as cement (not shown). Plate 71 is, in turn, pivotally connected to block 73 via suitable conventional means (also not shown) so as to permit plate 71 and element 63 to be rotated about axis 75 which, preferably, in the assembled illuminator intersects and is perpendicular to illuminator axis 53. Block 73 is provided with a curved surface 77 centered about axis 65 which rides on a complimentary curved surface 79 provided on support 81. A suitable track mechanism (not shown) may be provided to insure engagement of surface 77 with surface 79. Support 81 is secured to the bottom of housing 35 by any suitable conventional means (also not shown).

By permitting element 63 and plate 71 to pivot about axis 75 the amount of offset obtained may, as previously explained, be varied. By proper dimensioning of element 63, plate 71, block 73 and support 81 such that the axis 65 is substantially coincident with illuminator axis 53 element 63 may be rotated about illuminator axis 53 to thereby change the angular orientation of the illuminating cone. It should be noted that the position of axes 65 and 75 is merely for convenience only and that obliquer assembly 61 would operate so long as: (1) element 63 is positioned relative to aperture diaphragm 57 such that surface 67 receives and intercepts the cone of rays which emerge therefrom; (2) surface 67 is inclined relative to axis 53; and (3) element 63 is of sufficient breadth that this cone emerges from surface 69.

Access to obliquer assembly 61 is provided through the top of housing 35 via a cover member 83 which is provided with a handle 85 as illustrated.

Light which emerges from surface 69 of element 63 is converged by a second condenser 87 and then directed by semi-reflective surface 89 toward the microscope objective (not shown) which lies along axis 91. Surface 89 is attached to the left hand end of housing 35 by suitable conventional means (not shown).

It is believed that element 63 with its substantially parallel surfaces 67 and 69 provides the best results. However, when there are space limitations the thickenss of the plate may be reduced if a thin wedge is secured to its rear surface so that the exit surface is no longer parallel to its entrance surface. This has the advantage of inducing an initial amount of deviation from the wedge angle which may be increased or decreased (i.e. compensated for) by the offset provided by the plate itself as the plate is rotated about an axis transverse to the illuminator axis 53.

Figure 4:
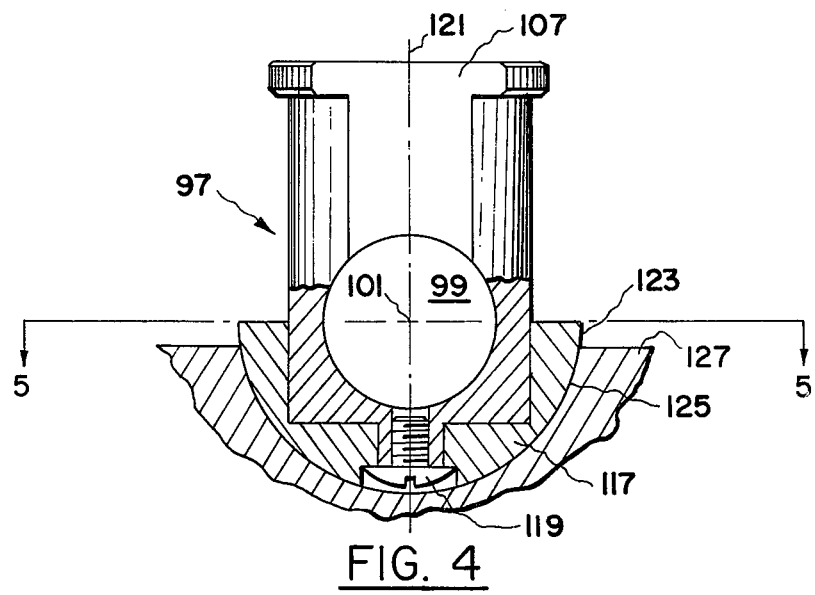
FIG. 4 is an end view on another enlarged scale of an alternate construction of the obliquer device.
Figure 5:
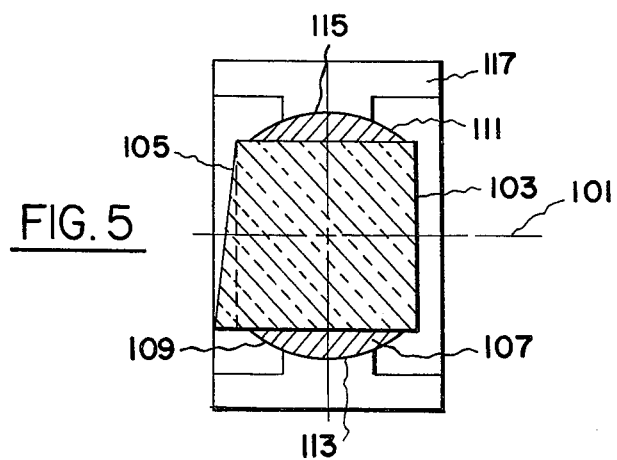
FIG. 5 is a sectional view taken along line 5—5 in FIG. 4.

A preferred form of the plate-wedge combination is illustrated in FIGS. 4 and 5. Assembly 97 includes an optical element 99 having longitudinal axis 101, a first plano surface 103 and a non parallel second plano surface 105. Element 99 is received in housing member 107 which is provided with a pair of arcuate surfaces 109 and 111 that are rotatably received in mating surfaces 113 and 115 provided in block 117. Housing 107 is secured to block 117 by a screw 119 so as to permit rotation of housing 107 relative to block 117 about axis 121. Block 117 is provided with an arcuate surface 123 which is received within a mating arcuate recess 125 provided in support 127. Both surfaces 123 and 125 have their radius of curvature conveniently centered about longitudinal axis 101 and components 99, 107, 117 and 127 are dimensioned so that when assembly 97 is mounted in illuminator 33 axis 101 is substantially coincident with illuminator axis 53 and axis 121 is perpendicular to and intersects axis 53.

Whereas the drawings and accompanying description have shown and described the preferred embodiments of the present invention, it should be apparent to those skilled in the art that various changes may be made in the form of the invention without affecting the scope thereof.

What I claim is:

1. In a vertical illuminator housing for a microscope including means for supporting a source of illumination the combination, arranged along the optical axis of the illuminator, comprising:
   a. condenser means centered with respect to said optical axis;
   b. aperture diaphragm means including an aperture, said aperture being centered with respect to said optical axis and spaced from said condenser means such that illumination incident from said condenser means is brought to focus in the plane of said aperture;
   c. plate means, said plate means including first and second plane refracting surfaces, said first surface being substantially parallel to said second surface; and
   d. means, supported on said illuminator housing, for positioning said plate means such that said first surface intersects and is inclined relative to said optical axis whereby illumination incident from said aperture is offset with respect to said optical axis.

2. The apparatus as set forth in claim 1 wherein said positioning means includes means for permitting rotational movement of said plate means about an axis which is transverse to said optical axis to permit variation of the angle which said first surface makes with said optical axis, whereby illumination incident from said aperture may be offset by the amount appropriate for the objective being used in said microscope.

3. The apparatus as set forth in claim 2 wherein said positioning means includes means for permitting rotational movement of said plate means about an axis substantially parallel with said optical axis whereby the angular position of illumination incident from said aperture with respect to said optical axis may be varied.

4. In a vertical illuminator housing for a microscope including means for supporting a source of illumination the combination, arranged along the optical axis of the illuminator, comprising:
   a. condenser means centered with respect to said optical axis;
   b. aperture diaphragm means including an aperture, said aperture being centered with respect to said optical axis and spaced from said condenser means such that illumination incident from said condenser means is brought to focus in the plane of said aperture;
   c. plate means said plate means including first and second plane refracting surfaces, said first surface being inclined with respect to said second surface; and
   d. means, supported on said illuminator housing, for positioning said plate means such that said first surface intersects and is inclined relative to said optical axis whereby illumination incident from said aperture is offset and tipped with respect to said optical axis.

5. The apparatus as set forth in claim 4 wherein said positioning means includes means for permitting rotational movement of said plate means about an axis which is transverse to said optical axis to permit variation of the angle which said first surface makes with said optical axis.

6. The apparatus as set forth in claim 5 wherein said positioning means includes means for permitting rotational movement of said plate means about an axis substantially parallel with said optical axis whereby the angular location of illumination incident from said aperture with respect to said optical axis may be varied.

* * * * *